United States Patent
Suzuki

(10) Patent No.: US 8,093,848 B2
(45) Date of Patent: Jan. 10, 2012

(54) MOTOR DRIVING APPARATUS AND MOTOR DRIVING METHOD

(75) Inventor: Toshiya Suzuki, Kyoto (JP)

(73) Assignee: Rohm Co., Ltd. (JP)

( * ) Notice: Subject to any disclaimer, the term of this patent is extended or adjusted under 35 U.S.C. 154(b) by 365 days.

(21) Appl. No.: 12/358,518

(22) Filed: Jan. 23, 2009

(65) Prior Publication Data

US 2009/0184672 A1    Jul. 23, 2009

(30) Foreign Application Priority Data

Jan. 23, 2008 (JP) ................................. 2008-012190

(51) Int. Cl.
*H02P 7/00* (2006.01)

(52) U.S. Cl. ...................................................... 318/432

(58) Field of Classification Search .................... 318/432
See application file for complete search history.

(56) References Cited

U.S. PATENT DOCUMENTS

| | | | | |
|---|---|---|---|---|
| 5,434,488 A | * | 7/1995 | Fukuoka ....................... | 318/434 |
| 7,053,573 B2 | * | 5/2006 | Okumura et al. ........ | 318/400.03 |
| 7,444,070 B2 | * | 10/2008 | Hahn et al. .................... | 388/809 |
| 7,590,334 B2 | * | 9/2009 | Yabusaki et al. .............. | 388/811 |
| 2008/0240688 A1 | * | 10/2008 | Alberkrack et al. .......... | 388/811 |
| 2008/0265811 A1 | * | 10/2008 | Brannen et al. ............... | 318/272 |

FOREIGN PATENT DOCUMENTS

| | | |
|---|---|---|
| JP | 7-31190 | 1/1995 |
| JP | 2001-284868 A | 10/2001 |
| JP | 2007-68344 A | 3/2007 |
| JP | 2007-68347 A | 3/2007 |
| JP | 2007-68348 A | 3/2007 |

* cited by examiner

*Primary Examiner* — Walter Benson
*Assistant Examiner* — Jorge Carrasquillo
(74) *Attorney, Agent, or Firm* — Cantor Colburn LLP

(57) ABSTRACT

One terminal of a first capacitor is set to a fixed electric potential. A charging/discharging circuit charges/discharges the first capacitor using a current that corresponds to an input signal which specifies the revolution of a motor. A comparator compares a voltage at the first capacitor with a predetermined voltage. A control signal generating unit generates a control voltage having a level that corresponds to an edge timing of a frequency signal synchronized with the rotation of the motor and an edge timing of the comparison signal output from the first comparator. Furthermore, the control signal generating unit switches the charging/discharging state of a charging/discharging circuit according to an edge of the periodic signal and an edge of the comparison signal. The motor is driven with a torque according to the control voltage.

15 Claims, 4 Drawing Sheets

MOTOR DRIVING APPARATUS AND MOTOR DRIVING METHOD

BACKGROUND OF THE INVENTION

1. Field of the Invention

The present invention relates to a motor driving technique, and particularly to a torque control technique thereof.

2. Description of the Related Art

In recent years, increase in the operation speed of personal computers and workstations has led to increase in the operation speeds of computation LSIs (large Scale Integrated Circuit) such as CPUs (Central Processing Unit), DSPs (Digital Signal Processor), etc.

Such LSIs have a problem in that an increase in the operation speed, i.e., an increase in clock frequency involves an increase in heat generation. The heat generation of the LSI leads to thermal runaway of the LSI itself, or affects its peripheral circuits, which becomes a problem. Accordingly, such a situation requires a suitable thermal cooling operation for the LSI, as a crucial technique.

Examples of techniques for cooling an LSI includes an air-cooling cooling method employing a cooling fan. In this method, for example, a cooling fan is arranged such that it faces the surface of the LSI, and cool air is blown onto the surface of the LSI using a cooling fan. When an LSI is cooled using a cooling fan, the temperature around the LSI is monitored, and the cooling operation is adjusted by changing the revolutions of the fan according to the temperature thus monitored (Patent documents 1 and 2).

Patent documents 3 through 5 disclose driving techniques for suitably setting the torque of a motor according to a target value of the revolution.

[Patent Document 1]
Japanese Patent Application Laid Open No. H7-31190
[Patent Document 2]
Japanese Patent Application Laid Open No. 2001-284868
[Patent Document 3]
Japanese Patent Application Laid Open No. 2007-68344
[Patent Document 4]
Japanese Patent Application Laid Open No. 2007-68347
[Patent Document 5]
Japanese Patent Application Laid Open No. 2007-68348

SUMMARY OF THE INVENTION

The present invention has been made in view of such a situation. Accordingly, it is a general purpose of the present invention to provide a motor driving apparatus and a motor driving method for driving a motor using a novel technique that differs from conventional techniques.

A motor driving apparatus according an embodiment of the present invention includes: a charging/discharging circuit which charges/discharges a first capacitor, of which one terminal is set to a fixed electric potential, using a current that corresponds to an input signal which specifies a revolution of a motor; a comparator which compares the voltage at the first capacitor with a predetermined threshold voltage; a control signal generating unit which generates a control signal having a level that corresponds to an edge timing of a periodic signal synchronized with the rotation of the motor and an edge timing of a comparison signal output from the comparator, and switches the charging/discharging state of the charging/discharging circuit; and a driving unit which drives the motor with a torque according to the control signal.

The edge interval of the comparison signal changes according to the input signal. Accordingly, by generating the control signal having a level that corresponds to an edge timing of the comparison signal and an edge timing of the periodic signal, such an arrangement allows the motor to be driven according to the input signal.

Also, the control signal generating unit may include: a pulse generating unit which generates a pulse signal of which the level transits at each of a predetermined edge of the periodic signal and a predetermined edge of the comparison signal output from the comparator; and a charge pump circuit which charges/discharges a second capacitor, of which one terminal is set to a fixed electric potential, according to the level of the pulse signal output from the pulse generating unit. Also, the control signal generating unit may output the electric potential at the other terminal of the second capacitor of the charge pump circuit as the control signal. Also, the charging/discharging circuit may switch the state between the charging state and the discharging state according to the level of the pulse signal.

With such an arrangement, the pulse signal is generated synchronously with the periodic signal.

Also, the control signal generating unit may include: a pulse generating unit which generates a pulse signal of which the level transits at each of a predetermined edge of the periodic signal and a predetermined edge of the comparison signal output from the comparator; and an integrating amplifier. Also, the integrating amplifier may include: an input resistor with one terminal used to receive the pulse signal as an input signal; an operational amplifier with the inverting input terminal connected to the other terminal of the input resistor; a feedback resistor which is provided between the non-inverting input terminal and the output terminal of the operational amplifier; and a capacitor which is provided in parallel with the feedback resistor. Also, the electric potential at the output terminal of the operational amplifier may be output as the control signal. Also, the charging/discharging circuit may switch the state between the charging state and the discharging state according to the level of the pulse signal.

With such an arrangement, the pulse signal is generated synchronously with the periodic signal.

Also, the charging/discharging circuit may include: a first current source which generates a first current that corresponds to the input signal; and a second current source which generates a predetermined second current. Also, the first capacitor may be charged/discharged using a composite current obtained by combining the first current and the second current.

With such an arrangement, the relation between the input signal and the torque (revolution) can be shifted according to the second current.

Also, the first current source may limit the first current to within a predetermined range. Such an arrangement is capable of limiting the torque.

Also, the input signal may be a signal which has been subjected to pulse modulation such that it has a duty ratio that corresponds to the target value of the revolution of the motor. Also, the motor driving apparatus may further include a filter which smoothes the input signal. Also, the charging/discharging circuit may include a voltage/current conversion circuit which converts the input signal thus smoothed by the filter into a current signal.

Such an arrangement is capable of setting the torque of the motor according to the input signal which has been subjected to pulse modulation and which has been output from the CPU.

Also, the motor driving apparatus may further include a capacitor terminal for connecting a shunt capacitor which is a component of the filter. In a case in which the input signal is to be provided in the form of analog voltage, the input signal can be input via the capacitor terminal.

With such an arrangement, the motor can be driven even in a case in which the input signal is supplied in the form an analog voltage having a voltage level which depends upon the temperature obtained using a thermistor.

Also, the motor driving apparatus may receive a digital signal having a duty ratio that corresponds to the revolution and an analog voltage having a voltage level that corresponds to the revolution as the input signals which specify the revolution of the motor. Also, the charging/discharging circuit may generate a current that corresponds to an input signal which specifies a higher revolution, which are selected from the aforementioned two input signals, so as to charge/discharge the first capacitor.

With such an arrangement, the revolutions can be controlled based upon both a digital signal output from a CPU (Central Processing Unit), microcomputer, or the like, and an analog voltage generated by a thermistor or the like.

Another embodiment of the present invention also relates to a motor driving apparatus. The motor driving apparatus includes: a pulse generating unit which generates a pulse signal having a pulse width that corresponds to an input signal which specifies the revolution of a motor, and having a cycle that corresponds to a periodic signal synchronized with the rotation of the motor; a time/voltage conversion unit which generates a control signal having a level that corresponds to the duty ratio of the pulse signal; and a driving unit which drives the motor with a torque according to the control signal.

With such an arrangement, the duty ratio of the pulse signal is set to a value that corresponds to the revolution of the motor and the input signal. By generating the control signal according to the pulse signal, such an arrangement drives the motor with a torque according to the input signal.

Yet another embodiment of the present invention relates to a cooling apparatus. The cooling apparatus includes: a fan motor; and any one of the above-described motor driving apparatuses which drive the fan motor.

With such an embodiment, the revolution of the fan motor is set according to the control signal, thereby cooling a target to be cooled at a desired level.

Yet another embodiment of the present invention relates to a motor driving method. The motor driving method includes: generating a current that corresponds to an input signal which specifies the revolution of a motor; charging/discharging a first capacitor, of which one terminal is set to a fixed electric, using the aforementioned current; comparing the voltage at the first capacitor with a predetermined threshold voltage, and generating a comparison signal having a level that corresponds to the relation of magnitude therebetween; generating a control signal having a level that corresponds to an edge timing of a periodic signal synchronized with the rotation of the motor and an edge timing of the comparison signal; switching the charging/discharging state of the first capacitor according to each edge timing of an edge of the periodic signal synchronized with the rotation of the motor and an edge of the comparison signal; and driving the motor with a torque according to the control signal.

Yet another embodiment of the present invention also relates to a motor driving method. The motor driving method includes: generating a periodic signal synchronized with the rotation of a motor; generating a pulse signal having a pulse width that corresponds to an input signal which specifies the revolution of the motor; generating a control signal having a level that corresponds to the time ratio of the pulse width of the pulse signal with respect to the cycle period of the periodic signal; and driving the motor with a torque according to the control signal.

Yet another embodiment of the present invention also relates to a motor driving method. The motor driving method includes: generating a pulse signal having a pulse width that corresponds to an input signal which specifies the revolution of a motor, and having a cycle that corresponds to a periodic signal synchronized with the rotation of the motor; generating a control signal having a level that corresponds to the duty ratio of the pulse signal; and driving the motor with a torque according to the control signal.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Description will be made regarding an embodiment of the present invention with reference to a fan motor driving apparatus mounted on an electronic computer such as a personal computer, workstation, etc., and used to drive a fan motor which cools a CPU and so forth, as an example.

Figure 1:
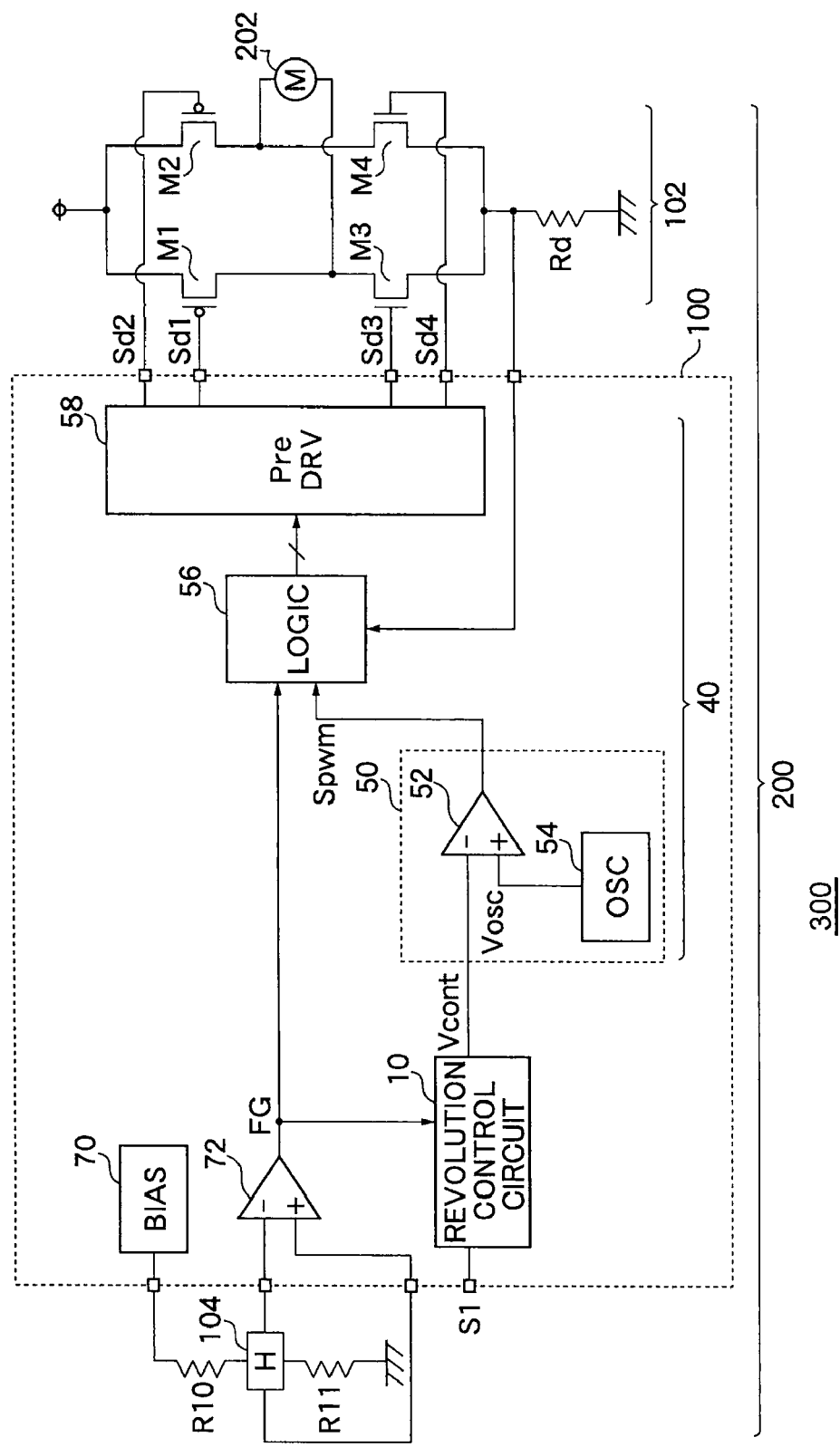
FIG. 1 is a diagram which show a configuration of a cooling apparatus including a motor driving apparatus according to an embodiment.

First, description will be made with reference to FIG. 1 regarding an overall configuration of a motor driving apparatus 200 according to an embodiment. FIG. 1 shows a configuration of a cooling apparatus 300 including a motor driving apparatus 200 according to the embodiment. The cooling apparatus 300 includes the motor driving apparatus 200 and a fan motor 202. The fan motor 202 is arranged in the vicinity of a CPU (not shown) to be cooled. The motor driving apparatus 200 drives the fan motor 202 according to a control input signal (which will simply be referred to as "control signal" hereafter) S1 which specifies the torque (revolution) of the fan motor 202. The input signal S1 may be supplied in the form of analog voltage that corresponds to the ambient temperature Ta, or in the form of a digital signal from a host processor such as a CPU or the like.

The motor driving apparatus 200 includes a control circuit 100 and a switching circuit 102. The fan motor 202 is a single-phase motor, and the switching circuit 102 is an H-bridge circuit. It should be noted that the fan motor 202 may be a multi-phase motor. With such an arrangement, the circuit configuration of the switching circuit 102 should be modified as appropriate.

Based upon the input signal S1, the control circuit 100 performs a switching driving operation of transistors M1 through M4 included in the switching circuit 102 according to a pulse width modulation signal (which will be referred to as "PWM signal" hereafter) having a duty ratio that corresponds to the target torque.

The control circuit 100 includes a revolution control circuit 10, a driving unit 40, a bias circuit 70, a hall comparator 72, monolithically integrated on a single semiconductor substrate in the form of a function IC. The switching circuit 102 may be integrated with the control circuit 100. Also, the switching circuit 102 may be provided in the form of an external discrete component.

A hall element 104 generates hall signals H+ and H− that corresponds to the position of the rotor of the fan motor 202, and outputs the hall signals thus generated to the control circuit 100. The hall comparator 72 makes a level comparison between the hall signals H+ and H−, and generates a periodic signal (which will be referred to as "FG signal" hereafter) which is synchronized with the rotation of the fan motor 202. The bias circuit 70 generates a bias voltage to be supplied to the hall element 104. The resistors R10 and R11 are provided in order to adjust the bias level of the hall element 104.

The revolution control circuit 10 generates a control voltage Vcont in the form of an analog signal having a voltage level that corresponds to the torque of the fan motor 202 based upon the input signal S1 and the FG signal. The driving unit 40 drives the fan motor 202 via the switching circuit 102 so as to generate the torque according to the control voltage Vcont.

The driving unit 40 includes a pulse width modulator 50, a logic unit 56, and a pre-driver 58. The pulse width modulator 50 generates a PWM signal Spwm having a duty ratio adjusted according to the level of the control voltage Vcont. The pulse width modulator 50 may include an oscillator 54 which generates a periodic voltage Vosc in the shape of a triangular waveform or a sawtooth waveform (ramp waveform), and a PWM comparator 52 which makes a comparison between the periodic voltage Vosc and the control voltage Vcont. The output of the PWM comparator 52 is input as the PWM signal Spwm to the logic unit 56 which is a downstream component. It should be noted that the configuration of the pulse width modulator 50 is not restricted to such an arrangement shown in FIG. 1.

Based upon the FG signal and the PWM signal Spwm, the logic unit 56 generates driving signals Sd1 through Sd4 to be supplied to the gates of the transistors M1 through M4 of the switching circuit 102. The pre-driver 58 amplifies the driving signals Sd1 through Sd4, and supplies these driving signals thus amplified to the gates of the transistors M1 through M4.

The switching circuit 102 includes a current detection resistor Rd provided on a path for the coil current that flows through the fan motor 202. The voltage drop across the detection resistor Rd is proportional to the coil current. The logic unit 56 monitors the voltage drop across the detection resistor Rd so as to protect the circuit from overcurrent and so as to control the torque. Such a function may be provided using known techniques, and is not restricted in particular.

It is a feature of the motor driving apparatus 200 according to the embodiment to include the revolution control circuit 10 which generates the control voltage Vcont based upon the FG signal and the input signal S1. Description will be made below regarding the configuration of the revolution control circuit 10.

Figure 2:
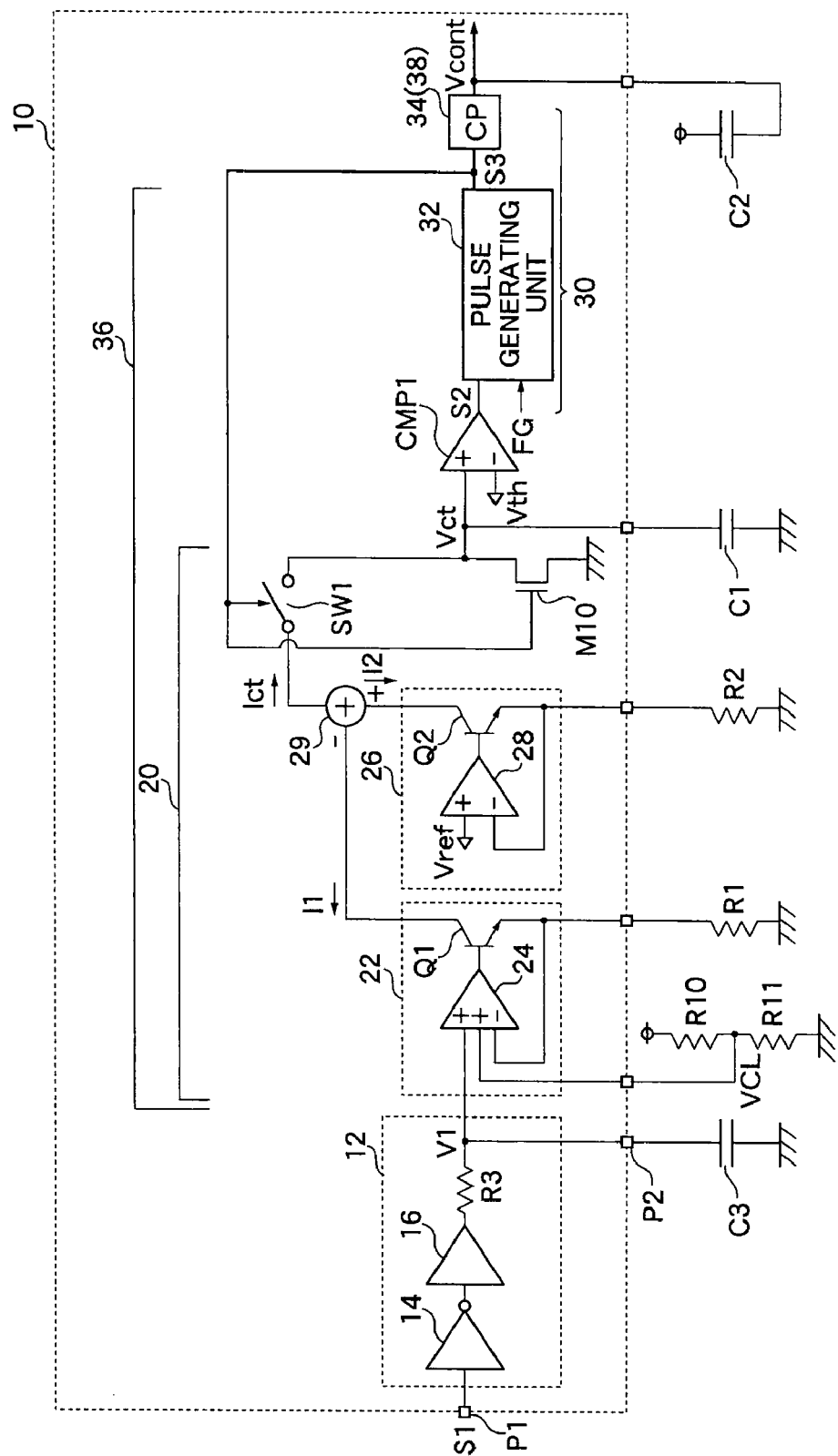
FIG. 2 is a circuit diagram which shows a configuration of a revolution control circuit according to an embodiment.

FIG. 2 is a circuit diagram which shows the configuration of the revolution control circuit 10 according to the embodiment. The revolution control circuit 10 includes a filter 12, a charging/discharging circuit 20, a first capacitor C1, a first comparator CMP1, a control signal generating unit 30, and peripheral components provided in the form of external components.

In a case in which the input signal S1 is supplied in the form of a pulse-modulated digital signal, the input signal S1 is supplied to the input terminal P1. With such an arrangement, the input signal S1 has a duty ratio adjusted according to the target value of the revolution (torque) of the fan motor 202. The filter 12 smoothes the input signal S1 so as to convert the input signal S1 into a DC voltage V1 having a voltage level that corresponds to the average level (duty ratio) of the input signal S1. The filter 12 includes an inverter 14, a buffer 16, a resistor R3, and a capacitor C3 provided in the form of an external component. The inverter 14 inverts the input signal S1. The resistor R3 and the capacitor C3 form a first-order low-pass filter which removes high-frequency component of the output of the buffer 16, and converts this signal into the DC voltage V1. The larger the duty ratio of the input signal S1 is, the smaller the DC voltage V1 is. In a case in which the inverter 14 is eliminated from the filter 12, the larger the duty ratio of the input signal S1, the larger the DC voltage V1 is. Thus, the relation between the duty ratio of the input signal S1 and the torque can be changed by adding or eliminating the inverter 14.

In a case in which the input voltage S1 is supplied in the form of an analog DC voltage (V1) having a level that corresponds to the torque, the input signal S1 may be directly input to the capacitor terminal P2 connected to the capacitor C3.

The first capacitor C1 is provided with one terminal connected to the ground, i.e., with one terminal set to a fixed electric potential. The charging/discharging circuit 20 charges/discharges the first capacitor C1 using a current Ict that corresponds to the input signal S1 which specifies the revolution of the motor.

The charging/discharging circuit 20 generates a periodic voltage Vct in the shape of a sawtooth waveform by charging and discharging the first capacitor C1.

The first comparator CMP1 compares the voltage Vct at the first capacitor C1 with a predetermined threshold voltage Vth. When Vct is greater than Vth, the first comparator CMP1 generates a comparison signal S2 at a high level. On the other hand, when Vct is smaller than Vth, the first comparator CMP1 generate a comparison signal S2 at a low level.

The control signal generating unit 30 receives an edge of the FG signal (periodic signal), which is synchronized with the rotation of the fan motor 202, and an edge of the comparison signal S2 output from the first comparator CMP1. The control signal generating unit 30 generates the control voltage Vcont in the form of an analog signal having a voltage level that corresponds to difference in edge timing (time difference) between these two signals. Furthermore, the control signal generating unit 30 switches the charging/discharging circuit 20 between the charging state and the discharging state using the edges of these two signals, i.e., the comparison signal S2 and the FG signal.

The control signal generating unit 30 includes a pulse generating unit 32 and a charge pump circuit 34. The pulse generating unit 32 generates a pulse signal S3 of which the level transits at a predetermined edge of the FG signal and at a predetermined edge of the comparison signal S2. The predetermined edge of the FG signal may be either the positive edge or negative edge. Also, both edges may be set to such a predetermined edge. Also, the predetermined edge of the comparison signal S2 may be either the positive edge or the negative edge.

For example, the pulse generating unit 32 may switch the pulse signal S3 to the high-level state at each of the positive edges and the negative edges of the FG signal, and may switch the pulse signal S3 to the low-level state at each positive edge of the comparison signal S2.

The charge pump circuit 34 charges/discharges the second capacitor C2, of which one terminal is set to a fixed electric potential, according to the level of the pulse signal S3 output from the pulse generating unit 32. For example, when the pulse signal S3 is at the high level, the charge pump circuit 34 charges the second capacitor C2 with a predetermined charging current Ich. When the pulse signal S3 is at the low level, the charge pump circuit 34 discharges the second capacitor C2 with a predetermined discharging current Idis. As a result, the control voltage Vcont is generated at the second capacitor C2 according to the duty ratio of the pulse signal S3. The longer the high-level period of the pulse signal S3 is, i.e., the greater the duty ratio is, the greater the control voltage Vcont is.

Figure 3:
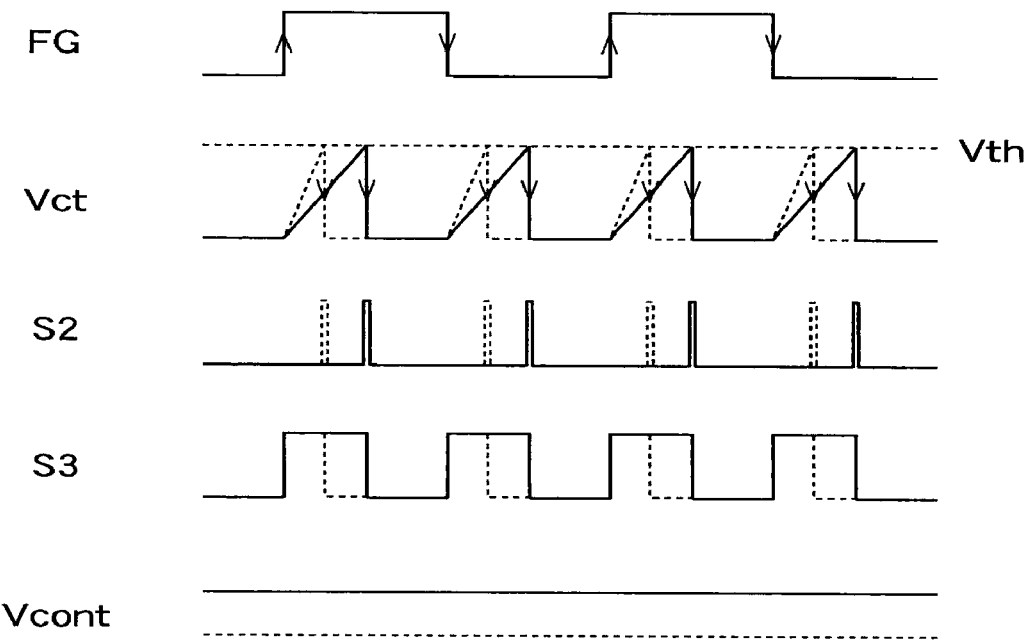
FIG. 3 is a time chart which shows the operation states of the revolution control circuit shown in FIG. 2.

The above-described is the configurations of the revolution control circuit 10 and the control circuit 100. FIG. 3 is a time chart which shows the operation states of the revolution control circuit 10 shown in FIG. 2. In the time chart shown in FIG. 3, the operation when the torque specified by the input signal S1 is a first value is indicated by a solid line, and the operation when the torque specified by the input signal S1 is a second value is indicated by a broken line.

When an edge occurs in the FG signal, the pulse signal S3 is switched to the high-level state, which instructs the charging/discharging circuit 20 to charge the first capacitor C1, thereby increasing the capacitor voltage Vct. When the capacitor voltage Vct reaches the threshold voltage Vth, the comparison signal S2 is switched to the high-level state. When the comparison signal S2 is switched to the high-level state, the pulse signal S3 transits to the low-level state, which instructs the charging/discharging circuit 20 to discharge the first capacitor C1. As a result, the capacitor voltage Vct is reduced. Subsequently, when a next edge occurs in the FG signal, the pulse signal S3 becomes the high-level state again. The revolution control circuit 10 repeatedly performs the aforementioned operation.

The charging current Ict in the charging/discharging circuit 20 changes according to the level of the input signal S1. As a result, this changes a period of time from the point in time at which the charging operation is started according to an edge in the FG signal up to the point in time at which the capacitor voltage Vct reaches the threshold voltage Vth. As a result, the pulse width of the pulse signal S3, i.e., the duty ratio of the pulse signal S3 changes according to the level of the input signal S1. The control voltage Vcont is generated by charging and discharging the second capacitor C2 according to the duty ratio of the pulse signal S3. Accordingly, the voltage value of the control voltage Vcont is adjusted according to the duty ratio of the pulse signal S3.

As described above, the revolution control circuit 10 according to the embodiment is capable of generating the control voltage Vcont which has a voltage level that corresponds to the input signal S1, and which is synchronized with the FG signal. Thus, the revolution control circuit 10 according to the embodiment allows the fan motor 202 to be driven with a torque that corresponds to the input signal S1.

Figure 4:
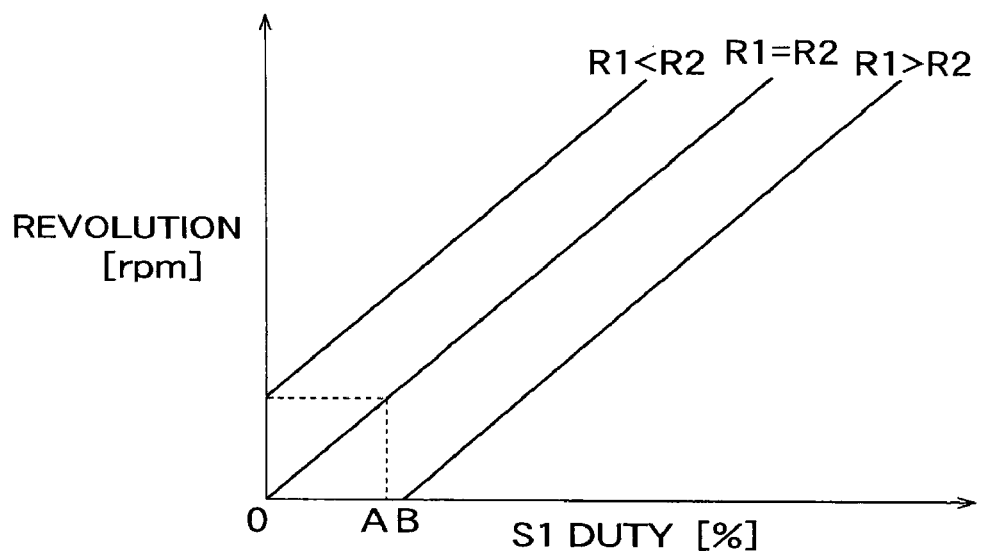
FIG. 4 is a graph which shows the relation (input/output characteristics) between the duty ratio of an input signal and the revolution of a fan motor.

FIG. 4 is a graph which shows the relation (input/output characteristics) between the duty ratio of the input signal S1 and the revolution of the fan motor 202. With the embodiment, the greater the duty ratio of the input signal S1 is, the smaller the voltage level of the control voltage Vcont is. In a case in which the driving unit 40 drives the fan motor 202 with a torque which is increased as the control voltage Vcont is lowered, the fan motor 202 is driven with a torque and at a revolution both of which are increased as the duty ratio of the input signal S1 is increased. FIG. 4 shows the input/output characteristics which change according to a change in the second current I2.

It should be noted that the relation of magnitude between the input signal S1 and the control voltage Vcont should satisfy a predetermined condition. Each of the relation of magnitude between the duty ratio of the input signal S1 and the DC voltage V1, the relation of magnitude between the DC voltage V1 and the first current I1, the relation of magnitude between the first current I1 and the charging current Ict, and the relation of magnitude between the duty ratio of the pulse signal S3 and the control voltage Vcont may be set as appropriate.

The above-described is the configurations and the operations of the revolution control circuit 10 and the control circuit 100. Next, detailed description will be made regarding the configuration and the operation of each block.

The charging/discharging circuit 20 includes a first current source 22, a second current source 26, a current combining unit 29, a charging switch SW1, and a discharging switch M10.

The first current source 22 generates a first current I1 according to the input signal S1. In the charging state, the charging/discharging circuit 20 switches the charging switch SW1 to the ON state, thereby supplying the charging current Ict, which corresponds to the first current I1, to the first capacitor C1. In the discharging state, the charging/discharging circuit 20 switches the discharging switch M10 to the ON state, thereby discharging the first capacitor C1.

The charging/discharging circuit 20 has the following feature, in addition to the basic configuration described above.

The second current source 26 generates a predetermined second current I2. The current combining unit 29 combines the first current I1 and the second current I2, and outputs the composite current thus combined as the charging current Ict, which is represented by the following Expression: Ict=I2−I1. The current combining unit 29 may be configured using a current mirror circuit or the like. The configuration of the current combining unit 29 is not restricted in particular.

The charging current Ict can be shifted by combining the first current I1 that corresponds to the input signal S1 with the second current I2 which is independent of the input signal S1. Detailed description thereof will be made later. In brief, such an arrangement allows the relation between the duty ratio and the torque to be shifted according to the value of the second current I2.

The first current source 22 has a configuration including a first operational amplifier 24, a bipolar transistor Q1, and a resistor R1 provided in the form of an external component. The DC voltage V1 is input to the non-inverting input terminal of the first operational amplifier 24. The resistor R1 is connected between the emitter of the bipolar transistor Q1 and the ground terminal. The first operational amplifier 24 is provided with the inverting input terminal connected to the emitter of the bipolar transistor Q1, and with the output terminal connected to the base of the bipolar transistor Q1. As a result, the first current flows through the bipolar transistor Q1, which is represented by the following Expression: I1=V1/R1.

The first current source 22 shown in FIG. 2 provides a function of limiting the first current I1 to within a predetermined range. In order to provide such a function, the first operational amplifier 24 includes two non-inverting input terminals. The second non-inverting input terminal receives a voltage VCL used to set a target value for a clamping operation. The voltage VCL is generated by dividing a predetermined voltage using the resistors R10 and R11. The first operational amplifier 24 amplifies the difference between the smaller one of the voltages at these two non-inverting input terminals and the voltage at the inverting input terminal. As a result, in the range of a V1 smaller than VCL, I1 is represented by V1/R1. On the other hand, in the range of a V1 greater than VCL, I1 is clamped at a target value ICL which is represented by VCL/R1.

The second current source 26 includes a second operational amplifier 28, a bipolar transistor Q2, and a resistor R2, and has the same configuration as that of the first current source 22. The second current I2 is represented by the following Expression: I2=Vref/R2.

The condition Ict=I2−I1 is satisfied. Accordingly, in a case in which an upper limit has been set for the first current I1, the lower limit of the charging current Ict is set as represented by I2−ICL. As can be clearly understood from the time chart shown in FIG. 3, in a case in which a lower limit has been set for the charging current Ict, an upper limit is set for the ON period (period in the high-level state) of the pulse signal S3. As a result, an upper limit can be set for the control voltage Vcont, thereby setting a lower limit for the torque (revolution) of the fan motor 202.

By inverting the logical level, such an arrangement allows an upper limit to be set for the torque.

With the charging/discharging circuit 20 having the configuration shown in FIG. 2, such an arrangement allows the slope of the input/output characteristics shown in FIG. 4 to be adjusted according to the resistance of the first resistor R1 and the capacitance of the first capacitor C1.

Furthermore, as shown in FIG. 4, the relation between the duty ratio and the revolution of the fan motor 202 can be shifted by changing the second current I2. The second current I2 can be changed according to the resistance of the second resistor R2. That is to say, the relation between the duty ratio and the revolutions can be adjusted according to a relation of magnitude between R1 and R2.

Now, description will be made assuming that the power supply voltage Vdd for the buffer 16 equals the reference voltage Vref for the second current source 26. In this case, in a case in which R1 and R2 are set to the same resistance, the first current I1 equals the second current I2 when the duty ratio is set to 0%. In this case, the charging current Ict is set to 0, thereby setting the revolution to 0.

In a case in which R2 is set to a resistance represented by the following Expression: R2=R/(1−A/100), i.e., in a case in which R1 is smaller than R2, the input/output characteristics curve is shifted from the original curve in which R1 equals R2 such that the revolution obtained at the duty ratio of A% based upon the original curve matches the revolution obtained at the duty ratio of 0% based upon the shifted curve.

On the other hand, in a case in which R2 is set to a resistance represented by the following Expression: R2=R1/(1+B/100), i.e., in a case in which R1 is greater than R2, the input/output characteristics curve is shifted such that the revolution obtained at the duty ratio of B% based upon the shifted curve is set to 0%.

The revolution control circuit 10 shown in FIG. 3 is capable of shifting the input/output characteristics by changing the first resistor R1 and the second resistor R2.

From another perspective, the revolution control circuit 10 shown in FIG. 3 can be regarded as a circuit having the following configuration.

The pulse generating unit 36 included in the revolution control circuit 10 generates the pulse signal S3 having a pulse width that corresponds to the input signal S1 which specifies the revolution of the motor. The control signal generating unit 30 generates the control voltage Vcont having the level that corresponds to the time ratio of the pulse width of the pulse signal S3 with respect to the cycle period of the FG signal synchronized with the rotation of the motor. The driving unit 40 drives the fan motor 202 with a torque according to the control voltage Vcont.

Also, from yet another perspective, the revolution control circuit 10 includes the filter 12, the pulse generating unit 36, and a time/voltage converting unit 38.

The filter 12 smoothes and converts the input signal S1 into the DC voltage V1 having a level that corresponds to the average level (duty ratio) of the input signal S1. The pulse generating unit 36 generates the pulse signal S3 having a pulse width that corresponds to the input signal S1 that specifies the revolution of the fan motor 202, and having the cycle that corresponds to the FG signal synchronized with the rotation of the fan motor 202. The time/voltage converting unit 38 generates the control voltage Vcont having a level that corresponds to the duty ratio of the pulse signal S3.

The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present invention.

Figure 5:
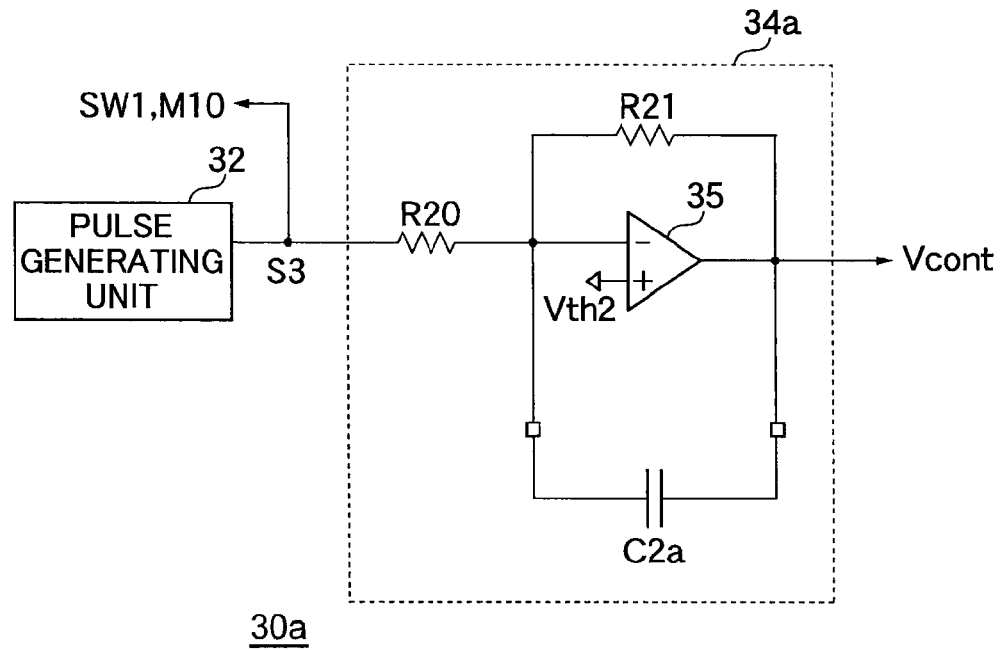
FIG. 5 is a circuit diagram which shows a configuration of a control signal generating unit according to a modification.

FIG. 5 is a circuit diagram which shows a configuration of a control signal generating unit 30a according to a modification. The control signal generating unit 30a shown in FIG. 5 includes an integrating amplifier circuit 34a, instead of the charge pump circuit 34 shown in FIG. 2. The integrating amplifier circuit 34a can be regarded as being the above-described time/voltage converting unit 38. The integrating amplifier circuit 34a includes an operational amplifier 35, an input resistor R20, a feedback resistor R21, and a second capacitor C2a.

The input resistor R20 is provided with one terminal connected to the inverting input terminal of the operational amplifier 35, and with the other terminal used to receive the pulse signal S3 as an input signal. The feedback resistor R21 is provided between the inverting input terminal and the output terminal of the operational amplifier 35. The second capacitor C2a is connected to the revolution control circuit 10 in the form of an external component arranged in parallel with the feedback resistor R21. A threshold voltage Vth2 is input to the inverting input terminal of the operational amplifier 35.

When the voltage level of the pulse signal S3 is greater than the threshold voltage Vth2 (this period will be referred to as "high-level period T1"), the integrating amplifier 34a charges the second capacitor C2a. On the other hand, when the voltage level of the pulse signal S3 is smaller than the threshold voltage Vth2 (this period will be referred to as "low-level period T2"), the integrating amplifier 34a discharges the second capacitor C2a. The integrating amplifier circuit 34a is operated such that the upper area obtained by slicing the curve of the pulse signal S3 using the curve of the threshold voltage Vth2 matches the lower area thereof.

As a result, the second capacitor C2a is charged and discharged according to the time ratio between the high-level period T1 and the low-level period T2. Thus, such an arrangement generates the control voltage Vcont having a level that corresponds to the duty ratio of the pulse signal S3.

With such an arrangement, the revolution control circuit 10 shown in FIG. 2 receives either the input signal S1 in the form of a digital signal having a duty ratio that corresponds to the target value of the revolution (torque) of the fan motor 202 or the DC voltage V1 in the form of an analog signal having a level that corresponds to the target value of the revolution, so as to control the fan motor 202. Also, a modification may be made as follows.

Figure 6:
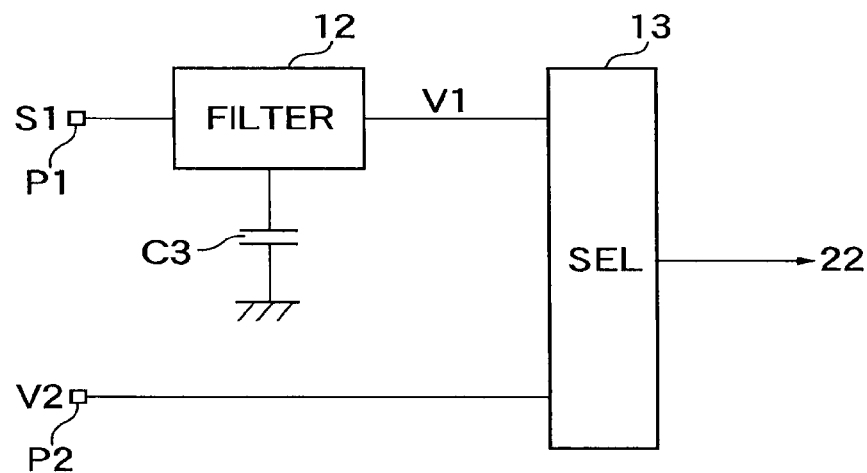
FIG. 6 is a circuit diagram which shows an input unit of the revolution control circuit which receives two input signals.

A modification may be made in which the revolution control circuit 10 receives both the input signal S1 in the form of a digital signal and the input voltage V2 in the form of an analog signal as input signals which specify the revolution. FIG. 6 is a circuit diagram which shows an input unit of the revolution control circuit 10 which receives these two input signals. An input unit 11 includes the filter 12 and a signal selection unit 13. The filter 12 smoothes the input signal S1, and outputs the DC voltage V1. The signal selection unit 13 receives the DC voltage V1 output from the filter 12 and the input voltage V2 in the form of an analog signal input from an external circuit. The signal selection unit 13 selects, from these two voltages V1 and V2, the voltage having a voltage level that corresponds to a higher revolution, and outputs the voltage thus selected to the first current source 22. The function of the signal selection unit 13 can be provided using a maximum value circuit or a minimum value circuit. Also, the function of the signal selection unit 13 can be provided using the operational amplifier 24, which is a downstream component, with an increased number of non-inverting input terminals each being connected to the voltages V1 and V2. The method for providing this function is not restricted in particular. Such a modification shown in FIG. 6 is capable of controlling the revolutions of the fan motor 202 giving consideration to both the digital control instruction from the CPU and the temperature information from a thermistor.

In such an embodiment, all the components forming the motor driving apparatus 200 may be monolithically integrated. Also, a part of such components may be provided in the form of a separate integrated circuit. Also, a part thereof may be provided in the form of discrete components. Which parts are to be provided in the form of an integrated circuit should be determined based upon costs, the occupied area, usage, etc.

Description has been made in the embodiment regarding an arrangement in which the cooling apparatus 300 is mounted on an electronic computer in order to cool a CPU. The usage of the present invention is not restricted to such an arrangement. Rather, the present invention can be used for various kinds of applications for cooling a heating element. Furthermore, the usage of the motor driving apparatus 200 according to the present embodiment is not restricted to the driving operation of a fan motor. Also, the motor driving apparatus 200 according to the present embodiment can be applied to the driving operations of other various kinds of motors.

While the preferred embodiments of the present invention have been described using specific terms, such description is for illustrative purposes only, and it is to be understood that changes and variations may be made without departing from the spirit or scope of the appended claims.

What is claimed is:

1. A motor driving apparatus comprising:
    a charging/discharging circuit which charges/discharges a first capacitor, of which one terminal is set to a fixed electric potential, using a current that corresponds to an input signal which specifies a revolution of a motor;
    a comparator configured to compares the voltage at the first capacitor with a predetermined threshold voltage and to generate a comparison signal;
    a control signal generating unit configured to receive a periodic signal synchronized with the rotation of the motor and the comparison signal from the comparator, to generate a control signal having a level that corresponds to an edge timing of the periodic signal and an edge timing of the comparison signal, and to switch the charging/discharging state of the charging/discharging circuit; and
    a driving unit which drives the motor with a torque according to the control signal.

2. A motor driving apparatus according to claim 1, wherein the control signal generating unit includes:
    a pulse generating unit which generates a pulse signal of which the level transits at each of a predetermined edge of the periodic signal and a predetermined edge of the comparison signal output from the comparator; and
    a charge pump circuit which charges/discharges a second capacitor, of which one terminal is set to a fixed electric potential, according to the level of the pulse signal output from the pulse generating unit,
    and wherein the electric potential at the other terminal of the second capacitor of the charge pump circuit is output as the control signal,
    and wherein the charging/discharging circuit switches the state between the charging state and the discharging state according to the level of the pulse signal.

3. A motor driving apparatus according to claim 1, wherein the control signal generating unit includes:
    a pulse generating unit which generates a pulse signal of which the level transits at each of a predetermined edge of the periodic signal and a predetermined edge of the comparison signal output from the comparator; and
    an integrating amplifier,
    and wherein the integrating amplifier includes:
        an input resistor with one terminal used to receive the pulse signal as an input signal;
        an operational amplifier with the inverting input terminal connected to the other terminal of the input resistor;
        a feedback resistor which is provided between the non-inverting input terminal and the output terminal of the operational amplifier; and
        a capacitor which is provided in parallel with the feedback resistor,
    and wherein the electric potential at the output terminal of the operational amplifier is output as the control signal,
    and wherein the charging/discharging circuit switches the state between the charging state and the discharging state according to the level of the pulse signal.

4. A motor driving apparatus according to claim 1, wherein the charging/discharging circuit includes:
    a first current source which generates a first current that corresponds to the input signal; and
    a second current source which generates a predetermined second current,
    and wherein the first capacitor is charged/discharged using a composite current obtained by combining the first current and the second current.

5. A motor driving apparatus according to claim 4, wherein the first current source limits the first current to within a predetermined range.

6. A motor driving apparatus according to claim 1, wherein the input signal is a signal which has been subjected to pulse modulation such that it has a duty ratio that corresponds to the target value of the revolution of the motor,
and wherein the motor driving apparatus further includes a filter which smoothes the input signal,
and wherein the charging/discharging circuit includes a voltage/current conversion circuit which converts the input signal thus smoothed by the filter into a current signal.

7. A motor driving apparatus according to claim 6, further including a capacitor terminal for connecting a shunt capacitor which is a component of the filter,
and wherein, in a case in which the input signal is to be provided in the form of analog voltage, the input signal can be input via the capacitor terminal.

8. A motor driving apparatus according to claim 1, wherein a digital signal having a duty ratio that corresponds to the revolution and an analog voltage having a voltage level that corresponds to the revolution are received as the input signals which specify the revolution of the motor,
and wherein the charging/discharging circuit generates a current that corresponds to an input signal which specifies a higher revolution, which are selected from the aforementioned two input signals, so as to charge/discharge the first capacitor.

9. A motor driving apparatus according to claim 1, wherein the control signal generating unit is configured to generate the control signal having a level that corresponds to time difference between an edge of the periodic signal and an edge of the comparison signal.

10. A motor driving apparatus according to claim 1, wherein the control signal generating unit is configured to generate a pulse signal of which the level transits at each of a predetermined edge of the periodic signal and at each of a predetermined edge of the comparison signal.

11. A motor driving apparatus according to claim 10, wherein the control signal generating unit is configured to switch the charging/discharging state of the charging/discharging circuit according to the level of the pulse signal.

12. A motor driving apparatus comprising:
a pulse generating unit configured to generates a pulse signal having a pulse width that corresponds to an input signal which specifies the revolution of a motor, and having a cycle that corresponds to a periodic signal synchronized with the rotation of the motor;
a time/voltage conversion unit configured to receive the pulse signal from the pulse generating unit and to generates a control signal having a level that corresponds to the duty ratio of the pulse signal; and
a driving unit which drives the motor with a torque according to the control signal.

13. A motor driving apparatus comprising:
a pulse generating unit configured to generate a pulse signal having a pulse width that corresponds to an input signal which specifies the revolution of a motor;
a control signal generating unit configured to receive the pulse signal from the pulse generating unit and to generates a control signal having a level that corresponds to the time ratio of the pulse width of the pulse signal with respect to the cycle period of a periodic signal synchronized with the rotation of the motor; and
a driving unit which drives the motor with a torque according to the control signal.

14. A cooling apparatus comprising:
a fan motor; and
a motor driving apparatus configured to drive the fan motor, wherein the motor driving apparatus comprises:
a charging/discharging circuit which charges/discharges a first capacitor, of which one terminal is set to a fixed electric potential, using a current that corresponds to an input signal which specifies a revolution of the fan motor;
a comparator configured to compare the voltage at the first capacitor with a predetermined threshold voltage and to generate a comparison signal;
a control signal generating unit configured to receive a periodic signal synchronized with the rotation of the fan motor and the comparison signal from the comparator, to generate a control signal having a level that corresponds to an edge timing of the periodic signal and an edge timing of the comparison signal, and to switch the charging/discharging state of the charging/discharging circuit; and
a driving unit which drives the fan motor with a torque according to the control signal.

15. A motor driving method comprising:
generating a current that corresponds to an input signal which specifies the revolution of a motor;
charging/discharging a first capacitor, of which one terminal is set to a fixed electric, using the aforementioned current;
comparing the voltage at the first capacitor with a predetermined threshold voltage, and generating a comparison signal having a level that corresponds to the relation of magnitude therebetween;
generating a control signal having a level that corresponds to time difference between an edge timing of a periodic signal synchronized with the rotation of the motor and an edge timing of the comparison signal;
switching the charging/discharging state of the first capacitor according to each edge timing of an edge of the periodic signal synchronized with the rotation of the motor and an edge of the comparison signal; and
driving the motor with a torque according to the control signal.

* * * * *